United States Patent [19]

Bongers et al.

[11] Patent Number: 4,792,540
[45] Date of Patent: Dec. 20, 1988

[54] ALKALI METAL LACTAMATE

[75] Inventors: Jozef J. M. Bongers, Stein (L.); Albert A. Van Geenen, Brunssum, both of Netherlands

[73] Assignee: Stamicarbon B.V., Geleen, Netherlands

[21] Appl. No.: 27,839

[22] Filed: Mar. 19, 1987

[30] Foreign Application Priority Data

Mar. 19, 1986 [NL] Netherlands ............ 8600698

[51] Int. Cl.$^4$ .............................................. B01J 31/02
[52] U.S. Cl. .................................... 502/167; 528/312
[58] Field of Search ............................................. 502/167

[56] References Cited

U.S. PATENT DOCUMENTS

| | | | |
|---|---|---|---|
| 2,727,017 | 12/1955 | Berthold | 260/78 |
| 2,857,364 | 10/1958 | Berthold et al. | 528/312 X |
| 3,772,253 | 11/1973 | Brassat | 260/78 |
| 3,775,362 | 11/1973 | Brassat | 260/37 N |
| 4,075,182 | 2/1978 | Bacskai | 502/167 X |
| 4,349,460 | 9/1982 | Hartmann | 502/167 |
| 4,595,746 | 6/1986 | Gabbert et al. | 502/167 X |

FOREIGN PATENT DOCUMENTS 1352731  5/1964  France .
1429585  3/1976  United Kingdom .

*Primary Examiner*—Patrick P. Garvin
*Attorney, Agent, or Firm*—Cushman, Darby & Cushman

[57] ABSTRACT

Catalyst composition solid at room temperature, based on alkali metal lactamate, characterized in that the content of methanol, ethanol and n-propanol is lower than 0,2 wt. % and that 0.1-5 wt. % of another alcohol is present, chosen from isopropanol or a branched or unbranched aliphatic or aromatic alcohol with 4-18 carbon atoms, which alcohol has a boiling point of 80° C. to 250° C.

This catalyst composition is suitable for lactam polymerization, especially in RIM techniques. Nylon block copolymer prepared with said catalyst composition and articles made frrom this nylon block copolymer.

8 Claims, No Drawings

ALKALI METAL LACTAMATE

The invention relates to a catalyst system solid at room temperature, based on an alkali metal lactamate, to a process for the preparation hereof and to polyamides obtained by anionic polymerization of lactam using this catalyst.

The application of alkali metal lactamate catalysts in the preparation of polyamides by anionic polymerization has been described frequently and is known, inter alia, from the published Netherlands patent application No. 172751. In it catalyst solutions are described obtained by dissolving α-pyrrolidone and ε-caprolactam in a solution of the alkali methanolate in methanol and by subsequently removing the methanol by distillation under reduced pressure at 50° C.

The disadvantage of this process is that during the removal of the methanol by distillation undesired polymerizations take place in the catalyst solution and methanol residues are left behind in the catalyst, which makes the catalyst less suitable for use during the anionic polymerization of polyamides and unsuitable for the preparation of impact-resistant polyamides according to the so-called Reaction Injection Moulding (RIM) technique.

Further, in the German Auslegeschrift No. 2230732, in example 8, a catalyst solution is prepared by dissolving in potassium methanolate in methanol caprolactam and pyrrolidone and removing the methanol by distillation at 50° C. and 10 Torr. Subsequently, 2-ethylhexanol is added to obtain a low-viscosity solution again.

This process, too, has the disadvantage that during the first phase undesired polymerization may occur, which makes the catalyst solution less suitable for the anionic polymerization of polyamides.

In example 1 of the German Auslegeschrift No. 2230732 a large amount of n-hexanol is added for the removal of the methanol by distillation in order to obtain a solution having a low viscosity. Mixtures of N-butylacetamide and 2-ethylhexanol are used too for this purpose. The alcohol added has a stabilizing effect on the catalyst solution, which is even strengthened by the addition of the acetamide. Nothing is said about the suppression of early polymerization during the preparation of the catalyst solution, only the stabilizing effect during storage is mentioned.

Applicant has now surprisingly found that a catalyst composition based on alkali metal lactamate, which is highly suitable in the RIM technique, is characterized in that the content of lower alcohol with 1-3 C atoms, which has a boiling point lower than 100° C., is lower than 0.2% (wt) and that at the same time 0.1-5% (wt) of a higher alcohol is present, which is isopropanol or a branched or unbranched aliphatic or aromatic alcohol with 4-18 C atoms, which higher alcohol has a boiling point of 80° C. to 250° C.

It has also been found that the preparation of a catalyst based on an alkali metal lactamate is characterized in that an alkali metal alcoholate, whether or not in alcohol, derived from an alcohol with 1-3 C atoms, which has a boiling point lower than 100° C., a higher alcohol, which is isopropanol or an aliphatic or aromatic alcohol with 4-18 C atoms, which higher alcohol has a boiling point of 80° C. to 250° C., and a lactam are brought to a temperature between 60° C. and 150° C. and alcohol is removed by distillation.

Preference is given to applying a temperature of 100° C. to 130° C. at which alcohol is removed by distillation.

The higher alcohol used is preferably isopropanol or an alcohol with 4-12 C atoms, which have a boiling point between 80° C. and 220° C. and a pKa>17. Examples of these so-called protective alcohols are isopropanol, butanol, methylpropanol, pentanol, methylbutanol, neopentylalcohol, hexanol, methylpentanol, dimethylbutanol, ethylbutanol, heptanol, methylhexanol, dimethylpentanol, ethylpentanol, trimethylbutanol, octanol, methylpentanol, ethylhexanol, dimethylhexanol, trimethylpentanol, methylethylpentanol, methyloctanol, dimethylheptanol, ethylheptanol, trimethylhexanol, dimethyloctanol, ethyloctanol, propylheptanol, tetramethylhexanol, isopropoxypropanol, methoxybutanol, butoxypropanol, ethoxypropanol, methoxypropanol, benzylalcohol and ethylbenzylalcohol. More specifically tertbutanol is applied.

The amount of the higher alcohol (protective alcohol) ranges from 0.05–5% (wt) calculated on the total reaction mixture and more specifically from 0.1–2% (wt).

It is possible also to prepare the catalyst mixture by starting from the alkali metal alcoholate of the higher alcohol, for instance potassium tert-butanolate, whether or not in tert-butanol. The disadvantage of this process is that these alcoholates are expensive and hardly commercially available. The present invention solves this problem by starting from a cheap alcoholate of a lower alcohol and adding a small amount of a higher alcohol. Thus undesired polymer formation during the preparation of the catalyst is so suppressed that no obstacles are met in the RIM process afterwards. Further, the storage life of such a catalyst composition is virtually unlimited.

Moreover, by using the higher alcohol it will be possible to prepare the catalyst at a higher temperature without undesired polymer formation, while at the same time the residual lower-alcohol content is so reduced that its adverse effect is eliminated, too.

In the said processes the content of polymer formed was measured by determining the amount of water-insoluble material. In all cases a value was found below 0.1% (wt).

The lactam used may be, inter alia, 2-pyrrolidone, 2-piperidone, enatholactam, decanolactam, undecanolactam, lauryllactam and caprolactam, but also substituted lactams, or mixtures of two or more lactams. More specifically caprolactam is used.

The alkali metal alcoholate used may be, inter alia, Na-methanolate, sodium ethanolate, sodium propanolate, potassium methanolate, potassium ethanolate and potassium propanolate. Preference is given to the use of sodium methanolate or potassium methanolate.

The present invention also relates to a process for preparing a nylon polymer, as well as to an article produced from such a nylon polymer. This process is characterized in that an acyllactam or carbamoyllactam activator in melted lactam is reactd to form a nylon polymer in the presence of the catalyst described above. Already a small amount of catalyst will suffice, for instance less than 1 mole % calculated on the lactam to be polymerized, but larger amounts, for instance up to 3 moles %, can be applied.

In the preparation of nylon polymer a number-average molecular weight for the nylon blocks of at least 2000, more specifically of at least 4000, is aimed at. This can be effected by varying the number of acyllactam or carbamoyllactam groups, derived from the acyllactam or carbamoyllactam activator, in respect of the amount of lactam added. Preferably from 0.1 mole % to 3 moles %. Acyllactam compounds that can be used are described, inter alia, in the European patent application Nos. 67693, 67694 and 67695, suitable carbamoyllactam compounds being described, inter alia, in the American patent specification Nos. 4540515 and 4540516.

In the preparation of the nylon polymer it may be essential to carry out the polymerization in the presence of one or more compounds that are used normally in nylon polymers, such as fillers, plasticizers, flame retardants, stabilizers, impact modifiers and reinforcing fibres, such as asbestos, glass fibres or metal fibres.

The present invention is elucidated by means of the following examples.

EXAMPLE 1

Sodium caprolactamate from sodium methanolate solution in methanol in the presence of neopentyl alcohol as protective alcohol Into a 1-liter round-bottom flask provided with a stirrer and a distillation condenser with receiver, 30 g sodium methanolate solution in 90 g methanol, 542.6 g caprolactam and 20 g neopentyl alcohol were introduced. The whole of it was heated up to 125° C. while being stirred. By stepwise lowering of the pressure, alcohol was removed from the mixture by distillation. The final pressure was 10 mm Hg. The distillation was continued until the first few caprolactam crystals wer formed in the condenser.

The catalyst, solid at room temperature, contained 1.1% (wt) neopentyl alcohol and 0.02% (wt) methanol (determined by gas chromatography.). The content of water-insoluble material (polymer) was <0.1% (wt).

EXAMPLE 2

Potassium caprolactamate from potassium methanolate in the presence of isopropanol as protective alcohol 57.9 g potassium methanolate (97%), 767.8 g ε-caprolactam and 35 g isopropanol were heated in a rotating film evaporator to 120° C. By lowering the pressure stepwise, alcohol was removed from this mixture by distillation. The final pressure was 10 mm Hg. The distillation was continued until the first caprolactam crystals were formed in the condenser.

After cooling to room temperature the solid catalyst contained 0.3% (wt) isopropanol and <0.01% (wt) methanol (gaschromatographically). The content of water-insoluble material (polymer) was <0.1% (wt).

EXAMPLE 3 up to and including 27

By using different protective alcohols alkali metal caprolactamates were prepared in caprolactam in analogy with example 2.

The amounts used and the composition of the catalysts obtained are shown in table I.

Where an alkali metal alcoholate solution was started from, it had been obtained by reacting alkali metal with an excess of alcohol. This excess is shown in column 4 of the table.

The catalysts obtained in caprolactam were all of them, at room tempreature, solid, crystalline substances with a water-insoluble material content <0.1% (wt).

TABLE I

| Ex. | Alkali alcoholate kind | wt (g) | Alcohol solvent wt (g) | Caprolactam wt (g) | Protective alcohol kind | wt (g) | Temp. °C. | Resulting catalyst containing low alc. (%) | Protective alc. (%) |
|---|---|---|---|---|---|---|---|---|---|
| 3 | sodium methanolate | 44.1 | — | 781 | isopropanol | 30 | 125 | 0.1 | 0.6 |
| 4 | " | 31.8 | — | 563 | n-butanol | 20 | 125 | 0.05 | 0.5 |
| 5 | " | 37.9 | — | 672 | t-butanol | 25 | 125 | <0.01 | 0.2 |
| 6 | " | 44.1 | — | 781 | 2-methylbutanol-1 | 25 | 125 | 0.02 | 0.7 |
| 7 | " | 30.8 | 92.5 | 545 | 3-ethylhexanol-3 | 30 | 120 | 0.1 | 1.1 |
| 8 | " | 141.9 | 426 | 2513 | 1-methoxypropanol-2 | 100 | 120 | 0.05 | 0.6 |
| 9 | " | 31.5 | 94.5 | 557 | t-butanol | 20 | 123 | 0.02 | 0.4 |
| 10 | " | 20.7 | 62 | 367 | hexanol-2 | 15 | 123 | 0.08 | 1.2 |
| 11 | natriumethanolate | 40.0 | 110 | 563 | pentanol-2 | 40 | 125 | 0.02 | 1.0 |
| 12 | " | 48.0 | 132 | 675 | neopentylalcohol | 25 | 125 | <0.01 | 0.9 |
| 13 | " | 51.4 | 141 | 723 | 1-ethoxypropanol-2 | 30 | 125 | 0.02 | 0.7 |
| 14 | " | 55.5 | 152.5 | 780 | heptanol | 20 | 120 | 0.02 | 0.7 |
| 15 | natriumpropanolate | 283 | 707 | 3300 | n-hexanol | 150 | 120 | <0.01 | 0.8 |
| 16 | " | 49.7 | 124 | 580 | 3-ethylhexanol-3 | 20 | 125 | 0.02 | 0.5 |
| 17 | kaliummethanolate | 58.9 | — | 781 | n-butanol | 30 | 115 | 0.03 | 0.2 |
| 18 | " | 42.1 | — | 558 | hexanol-2 | 25 | 125 | <0.01 | 0.7 |
| 19 | " | 51.5 | — | 683 | neopentylalcohol | 30 | 123 | <0.01 | 0.4 |
| 20 | " | 59.8 | 179.5 | 793 | neopentylalcohol | 30 | 123 | <0.01 | 0.3 |
| 21 | " | 59.3 | 178 | 786 | 1-isopropoxypropanol-2 | 30 | 126 | 0.02 | 0.6 |
| 22 | " | 54.8 | 164.5 | 727 | t-butanol | 30 | 125 | <0.01 | 0.9 |
| 23 | kaliumethanolate | 53.2 | 160 | 588 | 3-methylhexanol-2 | 30 | 120 | 0.02 | 1.5 |
| 24 | " | 54.5 | — | 602 | isobutanol | 30 | 118 | 0.03 | 0.6 |
| 25 | " | 57.3 | — | 633 | sec-butanol | 30 | 125 | 0.02 | 0.7 |
| 26 | kaliumpropanolate | 83.9 | 240 | 795 | 4-ethylheptanol-4 | 25 | 125 | 0.03 | 0.9 |
| 27 | " | 38.2 | 109 | 362 | n-hexanol | 15 | 125 | 0.04 | 1.3 |

EXAMPLE 28

Potassium caprolactamate from potassium-t-butanolate

In a rotating film evaporator 457.6 g (4 moles 98%) potassium-t-butanolate was suspended, while being heated to 125° C., in 3844 g ε-caprolactam.

By lowering the pressure stepwise, t-butanol was removed from this mixture by distillation. The potassium caprolactamate formed was dissolved in the process. The final pressure was 10 mm Hg. The distillation was continued until the first few caprolactam crystals appeared in the condenser.

After cooling to room eemperature a solid catalyst was obtained having a t-butanol content of 0.52% (wt) and a water-insoluble material content (polymer) <0.1% (wt).

EXAMPLE A (COMPARATIVE EXAMPLE)

Potassium caprolactamate from potassium ethanolate

In a rotating film evaporator 42 g potassium ethanolate was dissolved, by heating to 125° C., in 560 g ε-caprolactam. By lowering the pressure stepwise ethanol was removed from this mixture by distillation. After some time (about 20 min. from the beginning of the distillation process) the temperature suddenly went up to 200° C. and a glassy mass of polymer was formed.

Example B (COMPARATIVE EXAMPLE)

Sodium caprolactamate from sodium methanolate/methanol

In a 1-liter round-bottom flask provided with stirrer, dropping funnel and distillation condenser with receiver 545 g ε-caprolactam was heated up to 90° C. During stirring and evacuation (10 mm Hg) 30 g sodium methanolate dissolved in 90 ml methanol was added to it in drops at such a rate that the temperature of the mixture did not rise above 95° C.

After complete addition, after-reaction was carried out for 15 minutes at 90° C.

After cooling to room temperature a solid catalyst was obtained with a methanol content of 1.2% (wt) and a content of water-insoluble material (polymer) of 0.4% (wt).

EXAMPLE C (COMPARATIVE EXAMPLE)

Potassium caprolactamate from potassium methanolate/methanol

In a 1-liter round-bottom flask provided with stirrer, dropping funnel and distillation condenser with receiver 543 g ε-caprolactam was heated up to 90° C. During stirring and evacuation (10 mm Hg) 42 g potassium methanolate dissolved in 90 ml methanol was added to it in drops at such a rate that the reaction mixture did not rise above 95° C. After complete addition after-reaction was carried out for 15 minutes at 90° C.

The solid and, at room temperature, 'sticky' catalyst contained 1.5% (wt) methanol and 1.2% (wt) water-insoluble material (polymer).

The comparative tests clearly show that without using a protective alcohol
a. polymerization during the preparation of the catalyst is hard to avoid
b. high preparation temperatures cannot be reached
c. the product contains a high percentage of low alcohol.

Polymerization test 36.8 g caprolactam were divided in about equal parts over 2 test tubes. These tubes were heated in an oil bath to 130° C. To one of the tubes 1.04 g caprolactam-blocked hexamethylenediisocyanate (78% (wt) in caprolactam) was added and to the other 2.09 g catalyst obtained according to any one of the preceding examples. After dissolution of the substances added, the two solutions were brought together, intimately mixed, upon which the mixture was put back in the oil bath (130° C.). Measured were the period of time in which the viscosity of the mixture increased rapidly (start of polymerization) and the period of time at which the polymer formed became detached from the wall by shrinking (full polymerization).

The results are summarized in the following Table II.

TABLE II

| catalyst acc. to example | start polymerization after: (sec) | complete polymerization after: (sec) | appearance |
|---|---|---|---|
| 1 | 22 | 83 | smooth |
| 5 | 19 | 87 | smooth |
| 18 | 20 | 90 | smooth |
| 26 | 18 | 89 | smooth |
| 28 | 12 | 85 | smooth |
| B | 50 | 120 | rough, dull |
| C | 45 | 115 | loose peel |

The polymerization tests reveal that as the content of the water-insoluble material in the catalyst increases the polymerization properties decrease.

Preparation of impact-resistant polyamide

Preparation of prepolymer 4760 g (1 mole) polypropyleneethertriol and 1500 g caprolactam-blocked hexamethylenediisocyanate (78% (wt) in caprolactam) were heated up to 120° C. during stirring.

At this temperature 23 g sodium lactamate (according to example 1) was added and the whole of it was after-reacted for 1 hour. The carbamoyl prepolymer obtained in this manner was used as impact modifier for nylon.

Nylon preparation

EXAMPLE 29

59.4 g carbamoyl prepolymer and 50 g caprolactam were heated in an Erlenmeyer flask to 90° C. In an other Erkenmeyer flask 19.1 g sodium caprolactamate (according to example 1) and 51.5 g caprolactam were heated up to 90° C. After complete dissolution the two components were mixed at 90° and poured into a steel sheet mould preheated to 130° C. After 5 minutes the mould was opened. The polyamide formed had a notch impact strength of 47 kJm$^{-2}$ at room temperature in dry condition.

EXAMPLE 30

In analogy to example 29 a nylon sheet was prepared using potassium lactamate according to example 28. At room temperature, in dry condition, the polyamide had a notch impact strength of 50 kJm$^{-2}$.

EXAMPLE D (COMPARATIVE EXAMPLE)

In analogy to example 29 a polyamide was prepared using potassium caprolactamate according to example 28, to which 0.3% (wt) methanol (calculated on the catalyst) had been added. The notch impact strength of the resulting polyamide was 18 kJm$^{-2}$.

EXAMPLE E (COMPARATIVE EXAMPLE)

In analogy to example 29 a nylon sheet was prepared using sodium caprolactamate according to example B. The resulting polyamide had a notch impact strength of 14 kJm$^{-2}$.

We claim:
1. Process for preparing a catalyst based on an alkali metal lactamate, characterized in that
   a.1 an alkali metal alcoholate, whether or not in the corresponding alcohol, derived from an alcohol with 1-3 carbon atoms, which alcohol has a boiling point lower than 100° C., together with a higher alcohol which is isopropanol or an aliphatic or aromatic alcohol with 4–18 carbon atoms, which higher alcohol has a boiling point of 80° C. to 250° C. or a.2 an alkali metal alcoholate, whether or not in the corresponding alcohol, which is isopropanol or an aliphatic or aromatic alcohol with 4–18 carbon atoms, which higher alcohol has a boiling point of 80° C. to 250° C., and b. a lactam are brought to a temperature between 60° C. and 150° C. and alcohol is removed by distillation.

2. Process according to claim 1, characterized in that an alkali metal alcoholate, whether or not in the corresponding alcohol, derived from an alcohol with 1–3 carbon atoms, which alcohol has a boiling point $<100°$ C., together with a higher alcohol, which is isopropanol or an aliphatic or aromatic alcohol with 4–18 carbon atoms, which higher alcohol has a boiling point of 80° C. to 250° C., and a lactam are brought to a temperature between 60° C. and 150° C. and alcohol is removed by distillation.

3. Process according to claim 2, characterized in that the alkali metal alcoholate applied is potassium methanolate or sodium methanolate and the higher alcohol tert-butanol.

4. Process according to claim 1, characterized in that an alkali metal alcoholate, whether or not in the corresponding alcohol, derived from a higher alcohol which is isopropanol or an aliphatic or aromatic alcohol with 4–18 carbon atoms, which higher alcohol has a boiling point of 80° C. to 250° C., and a lactam are brought to a temperature between 60° C. and 150° C. and alcohol is removed by distillation.

5. Catalyst composition produced by the process of claim 1, solid at room temperature, based on alkali metal lactamate, characterized in that the content of lower linear alcohol with 1–3 carbon atoms, which has a boiling point lower than 100° C., is lower than 0.2% (wt) and that 0.1–5% (wt) of a higher alcohol is present, selected from the group consisting of isopropanol, a branched or unbranched aliphatic alcohol with 4–18 carbon atoms and a branched or unbranched aromatic alcohol with 4–18 carbon atoms, which higher alcohol has a boiling point of 80° C. to 250° C.

6. Catalyst composition according to claim 5, characterized in that the higher alcohol is isopropanol, n-butanol, tert-butanol, isobutanol, 2-methylbutanol-1, 3-ethylhexanol-3, 1-methoxy-propanol-2, hexanol-2, pentanol-2, neopentyl alcohol, 1-ethoxypropanol-2, heptanol, n-hexanol, 1-isopropoxypropanol-2, 3-methylhexanol-2 or 4-thylheptanol-4.

7. Catalyst composition according to claim 6, characterized in that the higher alcohol is tert-butanol.

8. Catalyst composition according to any one of claims 5, 6 and 7 characterized in that 0.1–2% (wt) of the higher alcohol is present.

* * * * *